United States Patent [19]

Gray et al.

[11] Patent Number: 5,595,826
[45] Date of Patent: Jan. 21, 1997

[54] CURABLE ORGANOPOLYSILOXANE COMPOSITIONS WITH IMPROVED ADHESION

[75] Inventors: Thomas E. Gray; Michael A. Lutz, both of Midland, Mich.

[73] Assignee: Dow Corning Corporation, Midland, Mich.

[21] Appl. No.: 540,815

[22] Filed: Oct. 11, 1995

[51] Int. Cl.$^6$ ........................................ B32B 9/06
[52] U.S. Cl. ........................ 428/450; 428/447; 428/451; 428/475.5; 524/861; 524/862; 524/789; 528/15; 528/16; 528/17
[58] Field of Search .................... 528/15, 16, 17; 524/861, 862, 789; 428/447, 451, 475.5, 450

[56] References Cited

U.S. PATENT DOCUMENTS

| | | | |
|---|---|---|---|
| 4,087,585 | 5/1978 | Schulz | 428/429 |
| 4,659,851 | 4/1987 | Plueddemann | 556/431 |
| 4,742,103 | 5/1988 | Morita et al. | 524/174 |
| 5,248,715 | 9/1993 | Gray et al. | 528/15 |
| 5,364,921 | 11/1994 | Gray et al. | 528/15 |

FOREIGN PATENT DOCUMENTS

| | | |
|---|---|---|
| 497349A2 | 1/1992 | European Pat. Off. . |
| 60-101146 | 6/1985 | Japan . |

*Primary Examiner*—Melvyn I. Marquis
*Attorney, Agent, or Firm*—William F. Boley

[57] ABSTRACT

Organopolysiloxane compositions which cure by the addition reaction of silicon-bonded lower alkenyl radicals with silicon-bonded hydrogen atoms and which exhibit improved adhesion to a variety of substrates. The compositions comprise an adhesion promoting mixture comprising an epoxy-functional compound, a compound having at least one hydroxy group and in the same molecule at least one substituent selected from a group consisting of silicon hydride, alkenyl, and acryl, and an aluminum compound or zirconium compound. Compression set of the cured organopolysiloxane compositions is not significantly effected by the adhesion promoting mixture.

27 Claims, No Drawings

5,595,826

CURABLE ORGANOPOLYSILOXANE COMPOSITIONS WITH IMPROVED ADHESION

BACKGROUND OF INVENTION

The present invention is curable organopolysiloxane compositions which cure by the addition reaction of silicon-bonded lower alkenyl radicals with silicon-bonded hydrogen atoms and which exhibits improved adhesion to a variety of substrates. The compositions comprise an adhesion promoting mixture comprising an epoxy-functional compound, a compound having at least one hydroxy group and in the same molecule at least one substituent selected from a group consisting of silicon hydride, alkenyl, and acryl, and an aluminum compound or zirconium compound. Compression set of the cured organopolysiloxane compositions is generally not significantly effected by the adhesion promoting mixture.

Organopolysiloxane compositions curable by a platinum catalyzed addition reaction of an organohydrogensiloxane to an organopolysiloxane containing ethylenically unsaturated hydrocarbon radicals have been used in numerous fields of industry because they do not generate by-products during curing, can be cured by heating at relatively low temperatures for short periods of time, have excellent flame retardancy, have excellent elastomeric properties, and have the ability to function as electrical insulators.

However, because addition-curable organopolysiloxane compositions do not adhere well to substrates with which they are in contact during curing, the surface of the substrate must be preliminarily treated with a primer if secure contact is to be maintained. This is disadvantageous from the standpoint of productivity, labor, and cost. As a consequence, numerous techniques have been proposed for imparting adhesion ability to such organopolysiloxane compositions by, among other means, the blending of particular types of silanes and polysiloxanes into such compositions.

Schulz, U.S. Pat. No. 4,087,585, describes a self-adhering silicone rubber composition which employs an adhesion promoting mixture comprising a polysiloxane having at least one silicon-bonded vinyl radical and at least one silicon-bonded hydroxyl radical and an epoxy-containing alkoxysilane.

Matsumoto et al., JP (Kokai) 60-101146, describe an adhesive polyorganosiloxane composition which employs an epoxy compound as an adhesion promotor and an organic aluminum compound.

Plueddemann, U.S. Pat. No. 4,659,851, describes a class of silane compounds which can cohesively bond organopolysiloxane elastomers and resins to organic and inorganic substrates. Included in the this class of compounds are compounds comprising at least one hydroxy group and in the same molecule at least one substituent selected from a group consisting of silicon hydride, alkenyl, and acryl.

Morita et al., U.S. Pat. No. 4,742,103, teach the adhesion of organopolysiloxane compositions curable by a platinum catalyzed hydrosilation reaction to various substrates is improved by the presence in the compositions of an organosilicon compound containing an ethylenically unsaturated group and at least one alkoxy group and at least one member from a class of compounds of aluminum or zirconium.

Osamu et al., EPO Application No. 0-497-349 A2, teaches organosiloxane compositions containing an adhesion promoter consisting essentially of a first organosilicon compound containing both silicon-bonded unsaturated and silicon-bonded alkoxy groups, a second organosilicon compound containing both silicon-bond epoxy and silicon bonded alkoxy groups, and an aluminum compound or zirconium compound.

SUMMARY OF INVENTION

The present invention is curable organopolysiloxane compositions which cure by the addition reaction of silicon-bonded lower alkenyl radicals with silicon-bonded hydrogen atoms and which exhibits improved adhesion to a variety of substrates. The compositions comprise an adhesion promoting mixture comprising an epoxy-functional compound, a compound having at least one hydroxy group and in the same molecule at least one substituent selected from a group consisting of silicon hydride, alkenyl, and acryl, and an aluminum compound or zirconium compound. Compression set of the cured organopolysiloxane compositions is generally not significantly effected by the adhesion promoting mixture.

DESCRIPTION OF INVENTION

The present invention is curable organopolysiloxane compositions having improved adhesion to a substrate. The composition comprises:

(A) 100 parts by weight of an organopolysiloxane containing at least two silicon-bonded lower alkenyl groups in each molecule and having a viscosity within a range of about 0.03 Pa·S (30 cP) to 100 Pa·S (100,000 cP), (B) 0.3 to 40 parts by weight of an organohydrogenpolysiloxane crosslinker containing at least two silicon-bonded hydrogens per molecule, (C) a catalytically effective amount of a platinum group metal catalyst, (D) 0.01 to 30 parts by weight of an epoxy-functional compound, (E) 0.01 to 30 parts by weight of a compound comprising at least one hydroxy group and in the same molecule at least one substituent selected from a group consisting of silicon hydride, alkenyl, and acryl, and (F) 0.0005 to 1 part by weight of a catalyst selected from a group consisting of compounds of aluminum and compounds of zirconium.

The organopolysiloxane comprising component (A) is the principal constituent of the present composition. Any of the known organopolysiloxanes containing at least two silicon-bonded lower alkenyl radicals in each molecule are suitable. The molecular configuration can range from straight chain to cyclics to network resins or a mixture thereof and the viscosity measured at 25° C. can be from about 0.03 Pa·S (30 cP) to 100 Pa·S (100,000 cP). Preferred organopolysiloxanes have straight chains and viscosities of about 0.05 Pa·S (50 cP) to 100 Pa·S (100,000 cP).

The silicon-bonded organic groups in the siloxane units of component (A) are monovalent hydrocarbon radicals, which may or may not be identical, and which are exemplified by alkyl radicals such as methyl, ethyl, propyl, and butyl; cycloalkyl radicals such as cyclopentyl and cyclohexyl; lower alkenyl radicals such as vinyl, allyl, and hexenyl; aryl radicals such as phenyl; aralkyl radicals such as phenylethyl; and halogenated monovalent hydrocarbon radicals such as gamma-chloropropyl and 3,3,3-trifluoropropyl. The lower alkenyl radicals required in component (A) can be present at any position in the molecule, but are preferably present at least at the molecular chain terminals. The lower alkenyl radicals are preferably vinyl. The substituent which can be present at the molecular chain terminals of the organopolysiloxane can include triorganosiloxy groups such as trimethylsiloxy, dimethylvinylsiloxy, dimethylphenylsiloxy, methylvinylphenylsiloxy; hydroxy group, and alkoxy groups. The type of monovalent hydrocarbon radical in the siloxane units, the type of groups located on the molecular chain terminals and the viscosity of component (A) are suitably selected based on the application of the curable composition.

The organohydrogenpolysiloxane comprising component (B) is the crosslinker which causes curing by an addition reaction with the lower alkenyl radicals of component (A) under the catalytic activity of component (C). The organohydrogenpolysiloxane contains at least two silicon-bonded hydrogen atoms per molecule, and can be a homopolymer or a copolymer. Those skilled in the art will recognize that if component (A) contains only two silicon-bonded lower alkenyl groups in each molecule, then component (B) must contain at least three silicon-bonded hydrogens per molecule in order for a crosslinked silicone to be formed when cured, or vice-versa. The configuration of component (B) can be linear, cyclic, or a network structure, with linear or cyclic molecules being preferred. The viscosity of component (B) at 25° C. can be from about 1 mPa·S (1 cP) to 10 Pa·S (10,000 cP).

In addition to hydrogen atoms, the substituents bonded to the silicon atoms of component (B) are monovalent hydrocarbons or substituted hydrocarbon radicals as exemplified by methyl, ethyl, butyl, phenyl, and 3,3,3-trifluoropropyl. Methyl is the preferred hydrocarbon radical substitution on the silicon atoms of component (B). The concentration of organohydrogenpolysiloxane in the present curable compositions is equivalent to from 0.5 to 10 silicon-bonded hydrogen atoms, preferably 0.7 to 2 silicon-bonded hydrogen atoms, for each silicon-bonded alkenyl radical in component (A). This condition is usually satisfied by the presence of from 0.3 to 40 weight part of organohydrogenpolysiloxane per 100 weight parts of component (A).

Component (C) of the present composition is a catalytic amount of a platinum group metal catalyst. The platinum group metal catalyst can be any such catalyst known to catalyze the reaction of silicon-bonded hydrogen atoms with silicon-bonded alkenyl groups. By "platinum group metal" it is meant ruthenium rhodium, palladium, osmium, iridium, and platinum. Examples of useful platinum group metal catalysts can be found in Lee et al., U.S. Pat. No. 3,989,668; Chang et al., U.S. Pat. No. 5,036,117; Ashby, U.S. Pat. No. 3,159,601; Lamoreaux, U.S. Pat. No. 3,220,972; Chalk et al., U.S. Pat. No. 3,296,291; Modic, U.S. Pat. No. 3,516,946; Karstedt, U.S. Pat. No. 3,814,730; Chandra et al., U.S. Pat. No. 3,928,629; and Willing, U.S. Pat. No. 3,419,593, all of which are hereby incorporated by reference to show useful platinum group metal catalysts and methods for their preparation.

A preferred platinum group metal catalyst is platinum metal and compounds and complexes of platinum. The platinum metal, platinum compound, or platinum complex can be retained on a solid support. The platinum group metal catalyst can be, for example, platinum black, chloroplatinic acid, chloroplatinic acid hexahydrate, a complex of chloroplatinic acid with sym-divinyltetramethyldisiloxane, dichlorobis(triphenylphosphine)platinum(II), dicarbonyldichloroplatinum(II), platinum chloride, and platinum oxide.

A preferred platinum group metal catalyst is chloroplatinic acid complexed with a liquid ethylenically unsaturated compound such as an olefin or an organosiloxane containing ethylenically unsaturated hydrocarbon radicals bonded to silicon. Complexes of chloroplatinic acid with such organosiloxanes are described, for example, in Willing, U.S. Pat. No. 3,419,593, which is incorporated by reference as teaching preferred catalysts. The most preferred platinum group metal containing catalyst is a neutralized complex of chloroplatinic acid or platinum dichloride with sym-divinyltetramethyldisiloxane.

The concentration of platinum group metal containing catalyst useful in the present curable silicone rubber composition can be that providing from about 0.1 to about 500 parts by weight of platinum group metal per million parts of the combined weight of component (A) and component (B). It is preferred that the platinum group metal catalyst provide about one to about 50 parts by weight of platinum group metal on the same basis.

Component (D) is an epoxy-functional compound. Examples of epoxy functional compounds which may be useful in the present composition are described in, for example, Matsumoto et al., JP (Kokai) 60-101146; Tanaka et al., EP 0-497-349 A2; and Schulz, U.S. Pat. No. 4,087,585, all of which are incorporated herein by reference. The epoxy functional compound can be a non-silicon containing compound such as

 (1)

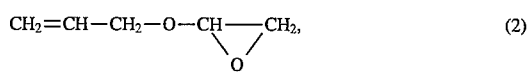 (2)

 (3)

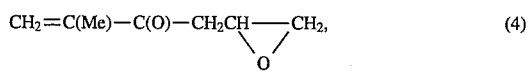 (4)

where Bu is butyl and Me is methyl.

The epoxy-functional compound can be a random or block siloxane copolymer described by, for example, formula

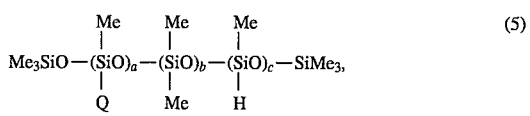 (5)

a siloxane described by, for example, formula

 (6)

or by a cyclic siloxane described by formula

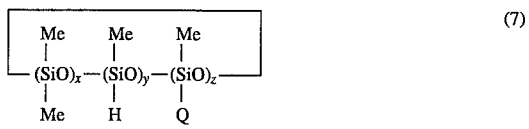 (7)

where Q is described by formula

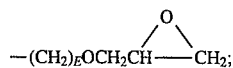

a, b, and c are positive integers, d=0 or a positive integer, z is a positive integer, x and y are zero or a positive integer, x+y+z=3 to about eight, and E=3 to about 10. Preferred is when subscript E=3.

A preferred epoxy-functional compound is an epoxy-functional alkoxysilane described by general formula

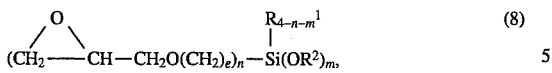

where $R^1$ is a saturated substituted or unsubstituted hydrocarbon comprising one to about 10 carbon atoms, $R^2$ is an unsubstituted alkyl comprising one to about 10 carbon atoms, n=1, 2, or 3, m=1, 2, or 3, n+m=2, 3, or 4, and e=3 to about 10. In the epoxy functional alkoxysilane, $R^1$ can be for example, methyl, ethyl, phenyl, and 3,3,3-trifluoropropyl. Preferred is when $R^1$ is methyl. In the epoxy-functional alkoxysilane, $R^2$ can be for example methyl, ethyl, propyl, and tert-butyl. Preferred is when $R^2$ is methyl. In the epoxy-functional alkoxysilane it is preferred that m equal at least two, most preferred is when m equals three. A preferred epoxy-functional alkoxysilane for use in the present composition is glycidoxypropyltrimethoxysilane.

The epoxy-functional compound is added to the present curable organosiloxane composition at a concentration of about 0.01 to about 30 parts by weight, and preferably about 0.05 to about 10 parts by weight per 100 parts the Component (A).

Component (E) is a compound comprising at least one hydroxy group and in the same molecule at least one substituent selected from a group consisting of silicon hydride, alkenyl, and acryl. Preferred is when Component (E) contains no alkoxy groups. Component (E) can be, for example, a carbinol functional organic compound as described by formula $$H_2C=CH-R^3-OH, \quad (9)$$

where $R^3$ is a divalent hydrocarbon radical comprising one to about 15 carbon atoms; a silane described by formula $$R^4{}_f R^5{}_g Si(OH)_{4-f-g}, \quad (10)$$

where each $R^4$ is independently selected from a group consisting of saturated hydrocarbon radicals comprising about one to 20 carbon atoms, each $R^5$ is independently selected from a group consisting of hydrogen, alkenyl, and acryl, f=0 to 2, g=1 to 3, and f+g=2 or 3; a carbinol functional silane described by formula $$R^4{}_h R^5{}_i Si(-R^3-OH)_{4-h-i}, \quad (11)$$

where $R^3$, $R^4$, and $R^5$ are as previously described h=0 to 2, i=1 to 3, and h+i=1 to 3; a hydroxy end-terminated siloxane described by formula

where $R^5$ is as previously described, each $R^6$ is independently selected from a group consisting of saturated unsubstituted and substituted hydrocarbons comprising less than about 12 carbon atoms, p=1 to about 40, t=0 to about 18, and p+t=2 to about 40; and a siloxane described by formula $$R^6{}_3SiO(R^6R^7SiO)_j(R^5R^6SiO)_k(R^6{}_2SiO)_L SiR^6{}_3, \quad (13)$$

where $R^5$ and $R^6$ are as previously described, $R^7$ is a carbinol functional aliphatic or aromatic radical, $j \geq 1$, $k \geq 1$, $L \geq 0$, and j+k+L=2 to 150.

In the carbinol functional compounds described by formula (9), $R^3$ can be, for example, an alkylene such as methylene, ethylene, and propylene or an arylene such as phenylene.

In the silanes described by formula (10), $R^4$ can be for example methyl, ethyl, tert-butyl, cyclopentane, cyclohexane, and phenyl; $R^5$ can be an alkenyl such as vinyl, allyl, or hexenyl; or acryl or hydrogen. Examples of useful silane compounds described by formula (10) can be found in Plueddemann, U.S. Pat. No. 4,659,851, which is incorporated herein by reference.

In formulas (12) and (13), $R^6$ can be, for example, an alkyl such as methyl, ethyl, and propyl; a substituted alkyl such as 3,3,3-trifluoropropyl; an aryl such as phenyl; and a cycloalkyl such as cyclopentyl and cyclohexyl. Preferred is when $R^6$ is methyl. In formulas (12) and (13), each $R^5$ is as previously described. Preferred is when $R^5$ is vinyl.

A preferred component (E) is a hydroxy end-terminated siloxane as described by formula (12). More preferred is a hydroxy end-terminated siloxane described by formula (12) where $R^5$ is vinyl, $R^6$ is methyl, p=1, and t=4.

The amount of component (E) added to the present composition is about 0.01 to 30 parts per 100 parts of component (A). Preferred is when about 0.04 to 5 parts of component (E) is added per 100 parts of component (A).

The aluminum compound or zirconium compound constituting component (F) serves to further improve the adhesion of the present curable organopolysiloxane compositions by its combined use with component (D) and component (E). Useful aluminum compounds and zirconium compounds are taught in Morita et al., U.S. Pat. No. 4,742,103, and in Matsumoto et al., J. P. (Kokai) 60-101146, which are incorporated by reference. The aluminum compound or zirconium compound can be an alcoholate comprising alkoxides, phenoxides, and carboxylates and those compounds where one or more of the alkoxide, phenoxide, or carboxyl groups are replaced by organic ligands or organosilicon groups derived from component (D). The alkoxy groups are exemplified by methoxy, ethoxy and iso-propoxy; the phenoxy groups are exemplified by phenoxy and p-methylphenoxy; and the carbonoxyl groups are exemplified by acetoxy, propionyloxy, isopropionyloxy, butyroxy, and stearoyloxy. The aluminum compound or zirconium compound can be a chelate such as obtained by the reaction of an aluminum alcoholate or zirconium alcoholate with an acetoacetate or dialkylmalonate. The aluminum compound or zirconium compound can be an organic salt of the aluminum or zirconium oxide or can be aluminum or zirconium acetylacetonate.

Aluminum compounds are preferred in the present composition. Aluminum compounds useful in the present compositions can include, for example, aluminum triisopropoxide, aluminum tri-t-butoxide, aluminum triacetate, aluminum tristearate, aluminum tribenzoate, bisethylacetoacetatealuminum monoacetylacetonate, acetoalkoxyaluminum diisopropylate, and aluminum 2,4-pentanedionate.

The zirconium compounds useful as component (F) are analogs of the described aluminum compounds. Specific examples are $Zr(OH)_2(C_2H_3)_2)_2$ and $Zr\{CH(COCH_3)_2\}_4$.

Component (F) is added to the present composition within the range of about 0.0005 to 1 part by weight, preferably from 0.001 to 0.1 part by weight per 100 parts by weight of component (A). The presence of too little component (F) will not provide an increase in adhesion, while the addition of an excess quantity is uneconomical and may adversely effect physical properties of the cured composition such as compression set and flammability.

In addition to components (A) through (F), the present composition may optionally containing a condensation catalyst such as a titanate or an alkoxysilane such as tetraethylorthosilicate.

In addition to components (A) through (F), a filler can be added to the present composition as necessary. Such fillers are exemplified by fumed silica, treated fumed silica, precipitated silica, treated precipitated silica, fused silica, finely divided quartz, diatomaceous earth, calcium carbonate, zinc oxide, titanium dioxide, ferric oxide, carbon black and pigments. The filler can generally be added in amounts of from about 10 to 400 parts by weight per 100 parts by weight of component (A).

The curable organopolysiloxane compositions of the present invention show improved adhesion to various substrates, for example, aluminum, nylon, vinyl ester, and epoxy. The present curable organopolysiloxane compositions are useful as heat curing adhesives for example in the electronics industry and in engineering for structural bonding. They are also useful as self priming encapsulants for electronic components.

The curable organopolysiloxane composition can be packaged as a two part-system where the polyorganosiloxane (A) together with catalyst (C) may be packaged in one part and the organohydrogen siloxane (B) in the other part, possibly mixed with part of polyorganosiloxane (A). The components (D) through (F) may be added separately or together to one or both parts. In a two-part system, it is preferred that the component (D) and component (F) be packaged in different parts. Alternatively, the organopolysiloxane compositions of the present invention may be packaged in a single container. In this case it is generally necessary to incorporate a cure inhibitor in order to avoid premature curing of the composition. The cure inhibitor can be any of those known in the art, for example an acetylenic inhibitor as described in U.S. Pat. No. 3,445,420.

The following examples are provided to illustrate the present invention. These examples are not intended to limit the scope of the claims herein.

EXAMPLES

Curable silicone rubber compositions were prepared from a two-part base composition as described in Table 1. Viscosities reported in the Examples were measured at 25° C.

TABLE 1

Composition of Two-Part Silicone Rubber Base

| Part A (Weight percent) | Part B | Component Description |
|---|---|---|
| 49 | 52.4 | 55 Pa · S Dimethylvinylsiloxy endblocked polydimethylsiloxane |
| 3.7 | 3.9 | 0.4 Pa · S Polydimethylsiloxane having 2 mole % hexenyl substitution (terminal + pendant) |
| 0.1 | 0.1 | Divinyltetramethyldisilazane |
| 6.2 | 6.6 | Hexamethyldisilazane |
| 0.5 | 0.6 | 0.014 Pa · S Dimethylhydroxy endblocked polydimethylsiloxane |
| 10.5 | 11.3 | Silica (ground quartz, Ave. Dia. 5μ) |
| 18.4 | 18.4 | Silica (Cab-o-Sil S17D) |
| 3.1 | 3.3 | Water |
| 2.1 | — | Hydrated calcium hydroxide |
| 0.4 | — | Chloroplatinic acid sym-divinyltetramethyldisiloxane complex (0.7 Wt. percent platinum metal) |
| — | 2.0 | 0.016 Pa · S Dimethylpolysiloxane having 0.8 weight percent Si—H |

TABLE 1-continued

Composition of Two-Part Silicone Rubber Base

| Part A (Weight percent) | Part B | Component Description |
|---|---|---|
| — | 0.3 | 1-Ethynyl-1-cyclohexane |

Part A was prepared by forming a mixture of the components described in Table 1, with the exception of the platinum catalyst, and then heating the mixture at a temperature of 170° C. for two to four hours under vacuum. After the mixture was cooled the platinum catalyst was added.

Part B was prepared by forming a mixture of the components described in Table 1, with the exception of the 0.4 Pa·S polydimethylsiloxane having 2 mole percent hexenyl substitution, the 0.016 Pa·S dimethylpolysiloxane having 0.8 weight percent Si-H, and the 1-ethynyl-1-cyclohexane. The mixture was heated at a temperature of 170° C. for two to four hours under vacuum. After the mixture was cooled the remainder of the part B components were added.

Curable silicone rubber compositions were prepared by mixing 26 g of part A with 26 g of part B. Adhesion promoting compounds as described in Table 2 were then mixed into the composition and the composition applied to substrates as described in Table 2. The substrates tested were aluminum coated aluminum alloy, Type 2024T3, Q Panel Company, Cleveland Ohio; nylon, Minlon NC40, Dupont Company, Wilmington, Del.; vinyl ester, Cytec 695, Cytec Industries, Perrysberg, Ohio; and epoxy coated steel.

All coated samples were cured at 150° C. for ten minutes. The percent of cohesive failure for each cured silicone rubber composition/substrate combination was measured using ASTM Standard Method D816.

The compression set samples was prepared by molding the compositions in a press into a sheet having a thickness of about 1.9 mm and curing for 5 minutes at 150° C. The cured sheet was cut into test samples and tested for compression set in accordance with ASTM D395, compressing for 22 hours at 177° C.

In the first example listed in Table 2 no adhesion promoting compounds were added to the curable silicone rubber composition. In the second example listed in Table 2 a standard adhesion promoting composition used commercially was added to the curable silicone rubber composition. This adhesion promoting composition consisted of 0.3 g n-propyl orthosilicate, 0.05 g glycidoxypropyltrimethoxysilane, 0.02 g tetrabutyl titanate, and 0.02 g of a 4.1 weight percent aluminum acetylacetonate in toluene solution. In Example 3, 0.7 weight percent of the reaction product of ethylene glycol and tetraethoxysilane was added to the curable silicone rubber composition as an adhesion promoter.

Examples 4 through 7 demonstrate the results obtained when the epoxy-functional compound (component (D)) is added to the curable silicone rubber composition in the absence of the compound comprising at least one hydroxy group and in the same molecule at least one substituent selected from a group consisting of silicon hydride, alkenyl, and acryl (component (E)). In Examples 4 through 7, in addition to component (D) being added to the curable silicone rubber composition, the following compounds were added: 0.7 weight percent of the reaction product of ethylene glycol and tetraethoxysilane having an average formula of (EtO)₃Si{OCH₂CH₂OSi(OEt)₂}₃OEt as determined by NMR (Et=ethyl) and referred to herein as "EG-TEOS product," 0.02 g of tetrabutyl titanate, and 0.02 g of a 4.1 weight percent aluminum acetylacetonate in toluene solution.

Examples 8 through 12 demonstrate the improved adhesion achieved when a combination of component (D) and component (E) is present in the curable silicone rubber composition. The composition of examples 8 through 12 were the same as example 4, with the exception that about 0.08 weight percent of the component (E) as listed in Table 2 was added to the composition. In example 12, 0.08 weight percent of a mixture comprising equal weight portions of HVS and TMPDAE, as defined below, was added to the curable silicone rubber composition as component (E).

TABLE 2

| | Adhesion component | | % Cohesion Failure | | | | |
|---|---|---|---|---|---|---|---|
| | D | E | Al | Nylon | Vinyl Ester | Epoxy | % CS |
| 1 | — | — | 0 | 0 | 0 | — | 19 |
| 2 | Standard | — | 50 | 5 | 10 | — | 26 |
| 3 | EG-TEOS Product | | 35 | 0 | 70 | — | 17 |
| 4 | 0.1% GPTMS | — | 60 | 0 | — | — | 23 |
| 5 | 0.7% GPTMS | — | 0 | — | — | — | 42 |
| 6 | 0.1% CY179 | — | 80 | 0 | 70 | — | 20 |
| 7 | 0.7% CY179 | — | 30 | 0 | 0 | — | 51 |
| 8 | 0.1% GPTMS | UDA | 100 | 0 | 95 | — | 25 |
| 9 | 0.1% GPTMS | ADGC | 100 | 2 | 95 | — | 22 |
| 10 | 0.1% GPTMS | TMPDAE | 100 | 10 | 85 | — | 23 |
| 11 | 0.1% GPTMS | HVS | 100 | 85 | 100 | 100 | 22 |
| 12 | 0.1% GPTMS | HVS + TMPDAE | 100 | 10 | 100 | 100 | 23 |

GPTMS = Glycidoxypropyltrimethoxysilane
CY179 = 3,4-Epoxycyclohexylmethyl-3,4-epoxycyclohexane carboxylate
UDA = Undecylenyl alcohol
ADGC = Allyldiglycolcarbonate
TMPDAE = Trimethylolpropanediallyl ether
HVS = Hydroxyvinylsiloxane described by average formula HO(Me₂SiO)₄MeViSiOH

We claim:

1. A curable organopolysiloxane composition having improved adhesion to a substrate, the composition comprising (A) 100 parts by weight of an organopolysiloxane containing at least two silicon-bonded lower alkenyl groups in each molecule and having a viscosity within a range of about 0.03 Pa·s to 100 Pa·s at 25° C., (B) from 0.3 to 40 parts by weight of an organohydrogenpolysiloxane crosslinker containing at least two silicon-bonded hydrogens per molecule, (C) a catalytically effective amount of a platinum group metal catalyst, (D) from 0.01 to 30 parts by weight of an epoxy functional compound, (E) from 0.01 to 30 parts by weight of a compound comprising at least one hydroxy group and in the same molecule at least one substituent selected from a group consisting of silicon hydride, alkenyl, and acryl, and (F) from 0.0005 to 1 part by weight of a catalyst selected from a group consisting of compounds of aluminum and compounds of zirconium, effective in promoting adhesion of the curable organopolysiloxane to a substrate.

2. A composition according to claim 1, where the organopolysiloxane containing at least two silicon-bonded lower alkenyl groups in each molecule is a straight chain organopolysiloxane having a viscosity at 25° C. within a range of about 0.05 Pa·s to 100 Pa·s and the lower alkenyl groups are vinyl.

3. A composition according to claim 1, where the organohydrogenpolysiloxane crosslinker has a viscosity at 25° C. of about 1 mPa·s to 10 Pa·s, organic substituents bonded to silicon atoms are methyl, and the concentration of organohydrogenpolysiloxane provides 0.7 to 2 silicon-bonded hydrogen atoms for each silicon-bonded alkenyl radical in Component (A).

4. A composition according to claim 1, where the platinum group metal catalyst is selected from a group consisting of platinum metal, platinum compounds, and platinum complexes.

5. A composition according to claim 1, where the platinum group metal catalyst is chloroplatinic acid complexed with a liquid olefin or an organosiloxane containing ethylenically unsaturated hydrocarbon radicals bonded to silicon.

6. A composition according to claim 1, where the platinum group metal catalyst is a neutralized complex of chloroplatinic acid or platinum dichloride with sym-divinyltetramethyldisiloxane.

7. A composition according to claim 1, where the platinum group metal containing catalyst provides about 0.1 to 500 parts by weight platinum group metal per million parts of the combined weights of Component (A) and Component (B).

8. A composition according to claim 1, where the platinum group metal containing catalyst provide about one to 50 parts by weight platinum group metal per million parts of the combined weights of Component (A) and Component (B).

9. A composition according to claim 1, where the epoxy-functional compound is described by formula

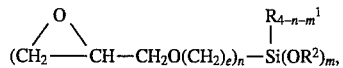

where $R^1$ is a saturated substituted or unsubstituted hydrocarbon comprising one to about 10 carbon atoms, $R^2$ is an unsubstituted alkyl comprising one to about 10 carbon atoms, n=1, 2, or 3, m=1, 2, or 3, n+m=2, 3, or 4, and e=3 to about 10.

10. A composition according to claim 9, where $R^1$ is methyl, $R^2$ is methyl, m=2 or 3, and e=3 to 10.

11. A composition according to claim 1, where the epoxy-functional compound is glycidoxypropyltrimethoxysilane.

12. A composition according to claim 1, where the epoxy-functional compound comprises about 0.05 to 10 parts by weight per 100 weight parts of Component (A).

13. A composition according to claim 1, where Component (E) is a hydroxy end-terminated siloxane described by formula

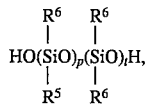

where each $R^5$ is independently selected from a group consisting of hydrogen, alkenyl, and acryl, each $R^6$ is independently selected from a group consisting of saturated unsubstituted and substituted hydrocarbons comprising less than about 12 carbon atoms, p=1 to about 40, t=0 to about 18, and p+t=2 to about 40.

14. A composition according to claim 13, where $R^5$ is vinyl, $R^6$ is methyl, p=1, and t=4.

15. A composition according to claim 1, where Component (E) comprises about 0.04 to 5 parts by weight per 100 weight parts of Component (A).

16. A composition according to claim 1, where Component (F) is a compound of zirconium, selected from a group consisting of zirconium alcoholates, chealates of zirconium alcoholates, organic salts of zirconium oxides, and zirconium acetylacetonate.

17. A composition according to claim 1, where Component (F) is a compound of aluminum, selected from a group consisting of aluminum alcoholates, chealates of aluminum alcoholates, organic salts of aluminum oxides, and aluminum acetylacetonate.

18. A composition according to claim 17, where the compound of aluminum is selected from a group consisting of aluminum triisopropoxide, aluminum tri-t-butoxide, aluminum triacetate, aluminum tristearate, aluminum tribenzoate, bisethylacetoacetatealuminum monoacetylacetonate, acetoalkoxyaluminum diisopropylate, aluminum acetylacetonate, and aluminum 2,4-pentanedionate.

19. A composition according to claim 1, where the compound of aluminum is aluminum acetylacetonate.

20. A composition according to claim 1, where Component (F) comprises about 0.001 to 0.1 parts by weight per 100 weight parts of Component (A).

21. A composition according to claim 1 further comprising a condensation catalyst selected from the group consisting of titanates and alkoxysilanes.

22. A composition according to claim 1 further comprising an alkoxysilane.

23. A composition according to claim 1 further comprising a filler selected from a group consisting of fumed silica, treated fumed silica, precipitated silica, treated precipitated silica, fused silica, and finely divided quartz.

24. A composite comprising an aluminum having bonded thereto a cured organopolysiloxane composition comprising (A) 100 parts by weight of an organopolysiloxane containing at least two silicon-bonded lower alkenyl groups in each molecule and having a viscosity within a range of about 0.03 Pa·s to 100 Pa·s at 25° C., (B) from 0.3 to 40 parts by weight of an organohydrogenpolysiloxane crosslinker containing at least two silicon-bonded hydrogens per molecule, (C) a catalytically effective amount of a platinum group metal catalyst, (D) from 0.01 to 30 parts by weight of an epoxy functional compound, (E) from 0.01 to 30 parts by weight of a compound comprising at least one hydroxy group and in the same molecule at least one substituent selected from a group consisting of silicon hydride, alkenyl, and acryl, and (F) from 0.0005 to 1 part by weight of a catalyst selected from a group consisting of compounds of aluminum and compounds of zirconium effective in promoting adhesion of the curable organopolysiloxane to a substrate.

25. A composite comprising a nylon having bonded thereto a cured organopolysiloxane composition comprising (A) 100 parts by weight of an organopolysiloxane containing at least two silicon-bonded lower alkenyl groups in each molecule and having a viscosity within a range of about 0.03 Pa·s to 100 Pa·s at 25° C., (B) from 0.3 to 40 parts by weight of an organohydrogenpolysiloxane crosslinker containing at least two silicon-bonded hydrogens per molecule, (C) a catalytically effective amount of a platinum group metal catalyst, (D) from 0.01 to 30 parts by weight of an epoxy functional compound, (E) from 0.01 to 30 parts by weight of a compound comprising at least one hydroxy group and in the same molecule at least one substituent selected from a group consisting of silicon hydride, alkenyl, and acryl, and (F) from 0.0005 to 1 part by weight of a catalyst selected from a group consisting of compounds of aluminum and compounds of zirconium effective in promoting adhesion of the curable organopolysiloxane to a substrate.

26. A composite comprising a vinyl ester substrate having bonded thereto a cured organopolysiloxane composition comprising (A) 100 parts by weight of an organopolysiloxane containing at least two silicon-bonded lower alkenyl groups in each molecule and having a viscosity within a range of about 0.03 Pa·s to 100 Pa·s at 25° C., (B) from 0.3 to 40 parts by weight of an organohydrogenpolysiloxane crosslinker containing at least two silicon-bonded hydrogens per molecule, (C) a catalytically effective amount of a platinum group metal catalyst, (D) from 0.01 to 30 parts by weight of an epoxy functional compound, (E) from 0.01 to 30 parts by weight of a compound comprising at least one hydroxy group and in the same molecule at least one substituent selected from a group consisting of silicon hydride, alkenyl, and acryl, and (F) from 0.0005 to 1 part by weight of a catalyst selected from a group consisting of compounds of aluminum and compounds of zirconium effective in promoting adhesion of the curable organopolysiloxane to a substrate.

27. A composite comprising an epoxy-coated substrate having bonded thereto a cured organopolysiloxane composition comprising (A) 100 parts by weight of an organopolysiloxane containing at least two silicon-bonded lower alkenyl groups in each molecule and having a viscosity within a range of about 0.03 Pa·s to 100 Pa·s at 25° C., (B) from 0.3 to 40 parts by weight of an organohydrogenpolysiloxane crosslinker containing at least two silicon-bonded hydrogens per molecule, (C) a catalytically effective amount of a platinum group metal catalyst,
(D) from 0.01 to 30 parts by weight of an epoxy functional compound,
(E) from 0.01 to 30 parts by weight of a compound comprising at least one hydroxy group and in the same molecule at least one substituent selected from a group consisting of silicon hydride, alkenyl, and acryl, and
(F) from 0.0005 to 1 part by weight of a catalyst selected from a group consisting of compounds of aluminum and compounds of zirconium effective in promoting adhesion of the curable organopolysiloxane to a substrate.

* * * * *